United States Patent
Xie

(10) Patent No.: US 9,426,679 B2
(45) Date of Patent: Aug. 23, 2016

(54) BASE STATION ANTENNA APPARATUS AND APPARATUS FOR COLLECTING ENGINEERING PARAMETER OF BASE STATION ANTENNA

(71) Applicant: Huawei Technologies Co., Ltd., Shenzhen, Guangdong (CN)

(72) Inventor: Chongwen Xie, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/496,922

(22) Filed: Sep. 25, 2014

(65) Prior Publication Data

US 2015/0011261 A1 Jan. 8, 2015

Related U.S. Application Data

(63) Continuation of application No. PCT/CN2013/073051, filed on Mar. 22, 2013.

(30) Foreign Application Priority Data

Apr. 11, 2012 (CN) .......................... 2012 1 0104439

(51) Int. Cl.
*H04M 1/00* (2006.01)
*H04W 24/06* (2009.01)
(Continued)

(52) U.S. Cl.
CPC .............. *H04W 24/06* (2013.01); *G01S 19/14* (2013.01); *G01S 19/36* (2013.01); *G01S 19/39* (2013.01);
(Continued)

(58) Field of Classification Search
CPC ....... H04W 88/08; H01Q 1/246; H04B 7/04; H04B 7/0834
USPC .......... 455/507, 517, 524, 67.11, 561, 562.1, 455/269, 272
See application file for complete search history.

(56) References Cited

U.S. PATENT DOCUMENTS

| 8,805,459 | B2 * | 8/2014 | Pohlabeln | ............. | H01Q 1/242 455/575.1 |
| 8,862,149 | B2 * | 10/2014 | Nakayasu | ............. | H04W 24/02 455/456.1 |
| 2003/0201947 | A1 | 10/2003 | Boucher | | |
| 2011/0092171 | A1 * | 4/2011 | Delforce | ............. | H04B 1/0064 455/90.2 |

FOREIGN PATENT DOCUMENTS

| CN | 101064374 A | 10/2007 |
| CN | 101446634 A | 6/2009 |

(Continued)

*Primary Examiner* — Tuan Pham
(74) *Attorney, Agent, or Firm* — Leydig, Voit & Mayer, Ltd.

(57) ABSTRACT

Embodiments of the present invention provide a base station antenna apparatus and an apparatus for collecting an engineering parameter of a base station antenna. A device for testing an antenna engineering parameter is integrated with a base station antenna, so as to improve collection efficiency, accuracy, and timeliness of an engineering parameter of a base station antenna. A base station antenna apparatus includes a base station antenna, an apparatus for collecting an engineering parameter of a base station antenna, and a base station antenna housing, where the apparatus for collecting an engineering parameter of a base station antenna is configured to collect, save, and manage the engineering parameter of the base station antenna; the base station antenna and the apparatus for collecting an engineering parameter of a base station antenna are connected and located in the base station antenna housing.

9 Claims, 6 Drawing Sheets

(51) Int. Cl.
  *H01Q 1/24* (2006.01)
  *G01S 19/14* (2010.01)
  *G01S 19/39* (2010.01)
  *G01S 19/36* (2010.01)
  *H01Q 1/08* (2006.01)
  *H01Q 1/12* (2006.01)
  *H01Q 21/28* (2006.01)
  *H04W 16/18* (2009.01)
  *G01S 19/53* (2010.01)

(52) U.S. Cl.
  CPC ............... *H01Q 1/08* (2013.01); *H01Q 1/125* (2013.01); *H01Q 1/246* (2013.01); *H01Q 21/28* (2013.01); *G01S 19/53* (2013.01); *H04W 16/18* (2013.01)

(56) References Cited

FOREIGN PATENT DOCUMENTS

| | | |
|---|---|---|
| CN | 102013546 A | 4/2011 |
| CN | 102032893 A | 4/2011 |
| CN | 201853794 U | 6/2011 |
| CN | 102170321 A | 8/2011 |
| CN | 102217358 A | 10/2011 |
| CN | 202143075 U | 2/2012 |
| CN | 102509902 A | 6/2012 |
| CN | 102637944 A | 8/2012 |
| DE | 202005019697 U1 | 3/2006 |
| EP | 1331469 A2 | 7/2003 |
| EP | 2784533 A1 | 10/2014 |

\* cited by examiner

BASE STATION ANTENNA APPARATUS AND APPARATUS FOR COLLECTING ENGINEERING PARAMETER OF BASE STATION ANTENNA

CROSS-REFERENCE TO RELATED APPLICATION

This application is a continuation of International Patent Application No. PCT/CN2013/073051, filed on Mar. 22, 2013, which claims priority to Chinese Patent Application No. 201210104439.X, filed on Apr. 11, 2012, both of which are hereby incorporated by reference in their entireties.

TECHNICAL FIELD

The present invention relates to the field of communications technologies, and in particular, to a base station antenna apparatus and an apparatus for collecting an engineering parameter of a base station antenna.

BACKGROUND

During planning and optimization of a mobile communications network, a more commonly used method is using a network planning simulation tool to perform network planning and optimization. In a procedure of simulating a network by using the simulation tool, important engineering parameters of a base station antenna are required, such as a geographical location, height, a mechanical azimuth, and a mechanical downtilt angle of a communications base station antenna. In addition, accuracy of these parameters directly affects accuracy of a simulation result and affects precision of a network parameter adjustment.

Currently, after the base station antenna is erected, the engineering parameters of the base station antenna, such as the geographical location, the height, the mechanical azimuth, and the mechanical downtilt angle of the base station antenna, are collected and manually recorded by engineering personnel using a carried external device onsite. This method requires that the engineering personnel operate onsite, resulting in low efficiency and high costs. In addition, after data is collected, a subsequent data transmission link is complicated, accuracy and timeliness are poor, and real-time monitoring cannot be performed on the engineering parameter of the base station antenna.

SUMMARY

The present invention provides a base station antenna apparatus and an apparatus for collecting an engineering parameter of a base station antenna. A device for collecting an engineering parameter of a base station antenna is integrated with the base station antenna, so as to improve collection efficiency, accuracy, and timeliness of the engineering parameter of the base station antenna and implement real-time monitoring on the engineering parameter of the base station antenna.

To solve the above technical problem, the following technical solutions are adopted in embodiments of the present invention:

A base station antenna apparatus includes a base station antenna, an apparatus for collecting an engineering parameter of a base station antenna, and a base station antenna housing, where:

the apparatus for collecting an engineering parameter of a base station antenna is configured to collect, save, and manage the engineering parameter of the base station antenna;

the base station antenna and the apparatus for collecting an engineering parameter of a base station antenna are connected and located in the base station antenna housing; and the apparatus for collecting an engineering parameter of a base station antenna includes at least two global positioning system GPS antennas and a processing apparatus, where the at least two GPS antennas are configured to collect the engineering parameter of the base station antenna, and the processing apparatus is configured to save and manage the engineering parameter of the base station antenna; and the processing apparatus is connected to the at least two GPS antennas so as to receive the engineering parameter of the base station antenna collected by the at least two GPS antennas.

An apparatus for collecting an engineering parameter of a base station antenna includes at least two global positioning system GPS antennas and a processing apparatus, where the at least two GPS antennas are configured to collect an engineering parameter of a base station antenna, and the processing apparatus is configured to save and manage the engineering parameter of the base station antenna; the processing apparatus is connected to the at least two GPS antennas so as to receive the engineering parameter of the base station antenna collected by the at least two GPS antennas; and the apparatus for collecting an engineering parameter of a base station antenna is disposed in a base station antenna housing.

The embodiments of the present invention provide a base station antenna apparatus and an apparatus for collecting an engineering parameter of a base station antenna. The base station antenna is integrated with the apparatus for collecting an engineering parameter of a base station antenna, where the apparatus for collecting an engineering parameter is configured to collect, save, and manage the engineering parameter of the base station antenna. Compared with the prior art in which when acquiring an engineering parameter of a base station antenna, engineering personnel need to carry an external collective device and perform onsite measurement in a base station antenna setting point, in the base station antenna apparatus provided in the embodiments of the present invention, the apparatus for collecting an engineering parameter of a base station antenna is directly disposed on the base station antenna, and the engineering parameter of the base station antenna can be acquired by using remote control, thereby improving collection efficiency, accuracy, and timeliness of the engineering parameter of the antenna and implementing real-time monitoring on the engineering parameter of the base station antenna.

BRIEF DESCRIPTION OF DRAWINGS

To illustrate the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
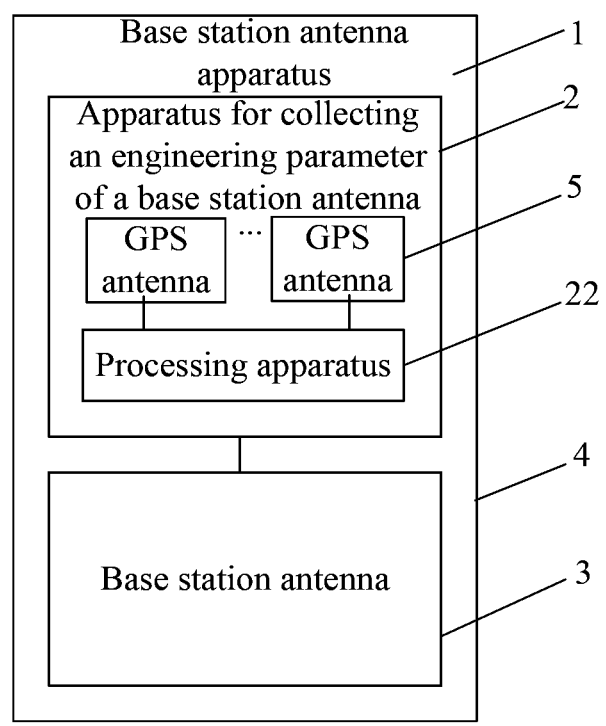
FIG. 1 is a schematic diagram of a base station antenna apparatus according to an embodiment of the present invention.

An embodiment of the present invention provides a base station antenna apparatus, as shown in FIG. 1, the base station antenna apparatus 1 includes:

a base station antenna 3, an apparatus 2 for collecting an engineering parameter of a base station antenna, and a base station antenna housing 4, where:

the apparatus 2 for collecting an engineering parameter of a base station antenna is configured to collect, save, and manage the engineering parameter of the base station antenna;

the base station antenna 3 and the apparatus 2 for collecting an engineering parameter of a base station antenna are connected and located in the base station antenna housing 4; and the apparatus 2 for collecting an engineering parameter of a base station antenna includes at least two GPS (Global Positioning System, global positioning system) antennas 5 and a processing apparatus 22; the at least two GPS antennas 5 are configured to collect the engineering parameter of the base station antenna, and the processing apparatus 22 is configured to save and manage the engineering parameter of the base station antenna; and the processing apparatus 22 is connected to the at least two GPS antennas 5 so as to receive the engineering parameter of the base station antenna collected by the at least two GPS antennas 5.

The base station antenna apparatus provided in this embodiment of the present invention integrates a base station antenna with an apparatus for collecting an engineering parameter of a base station antenna, where the apparatus for collecting an engineering parameter of a base station antenna is configured to collect, save, and manage the engineering parameter of the base station antenna. Compared with the prior art in which when acquiring an engineering parameter of a base station antenna, engineering personnel need to carry an external collective device and perform onsite measurement in a base station antenna setting point, in the base station antenna apparatus provided in the present invention, the apparatus for collecting an engineering parameter is directly disposed on the base station antenna, and the engineering parameter of the base station antenna can be acquired by using remote control, thereby improving collection efficiency, accuracy, and timeliness of the engineering parameter of the base station antenna and implementing real-time monitoring on the engineering parameter of the base station antenna.

Figure 2:
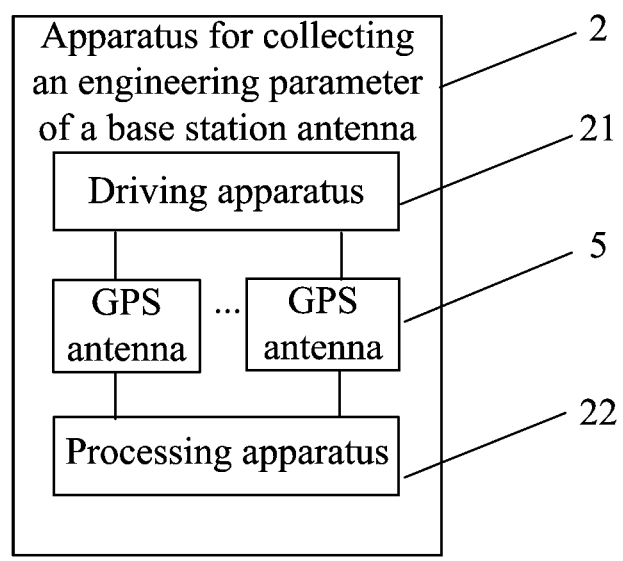
FIG. 2 is a schematic diagram of an apparatus for collecting an engineering parameter of a base station antenna in a base station antenna apparatus according to an embodiment of the present invention.

Further, in this embodiment of the present invention, as shown in FIG. 2, the apparatus 2 for collecting an engineering parameter of a base station antenna further includes a driving apparatus 21. The GPS antennas 5 are arranged on the driving apparatus 21.

The driving apparatus 21 is configured to drive the at least two GPS antennas 5 to move from the inside of the base station antenna housing to the outside of the base station antenna housing, or drive the at least two GPS antennas 5 to move from the outside of the base station antenna housing to the inside of the base station antenna housing.

Increasing a GPS antenna on a base station antenna may increase the volume of the base station antenna, for example, when two GPS antenna exist, two GPS antennas require a certain distance to acquire a better ability to acquire a satellite signal. When the GPS antennas are integrated with the base station antenna, the width of the base station antenna is increased; however, certain limitations are imposed on the appearance specification of the base station antenna, for example, a customer has a specific requirement on an appearance of the base station antenna, and after the base station antenna is added to the apparatus for collecting an engineering parameter of a base station antenna, the appearance specification of the base station antenna fails to meet the requirement; therefore, in the base station antenna apparatus provided in this embodiment of the present invention, the GPS antennas are disposed in the base station antenna housing, so that the overall appearance specification of the base station antenna is unchanged, and the GPS antennas can also be moved to the outside of the base station antenna housing by the driving apparatus in the base station antenna apparatus when the GPS antennas work, thereby adjusting distances among multiple GPS antennas, so that the GPS antennas acquire a better collection effect.

Figure 3:
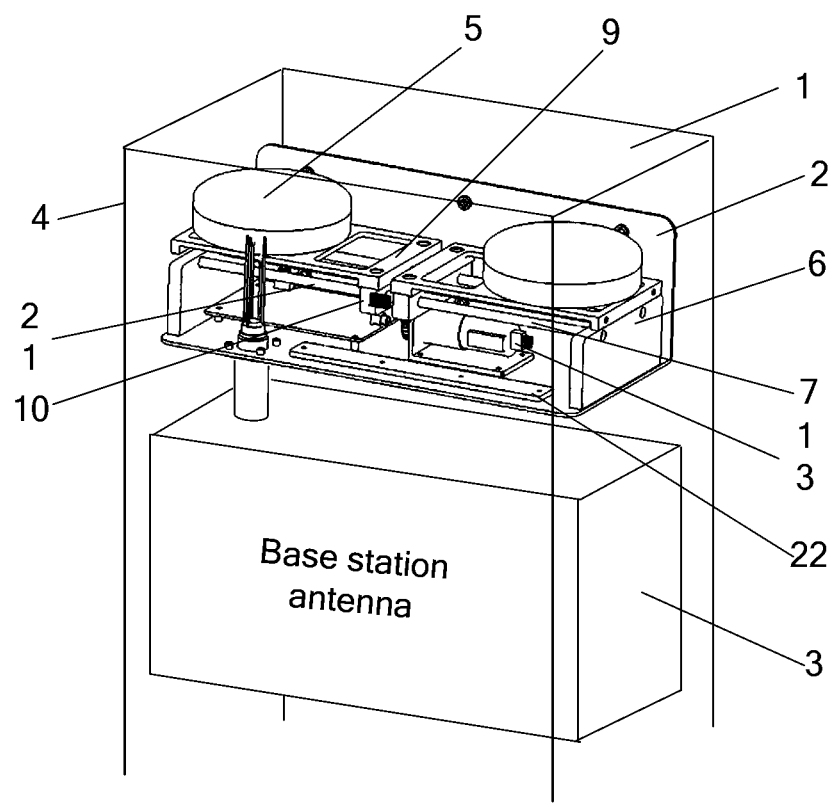
FIG. 3 is a schematic structural diagram of a base station antenna apparatus including two GPS antennas according to an embodiment of the present invention.
Figure 4:
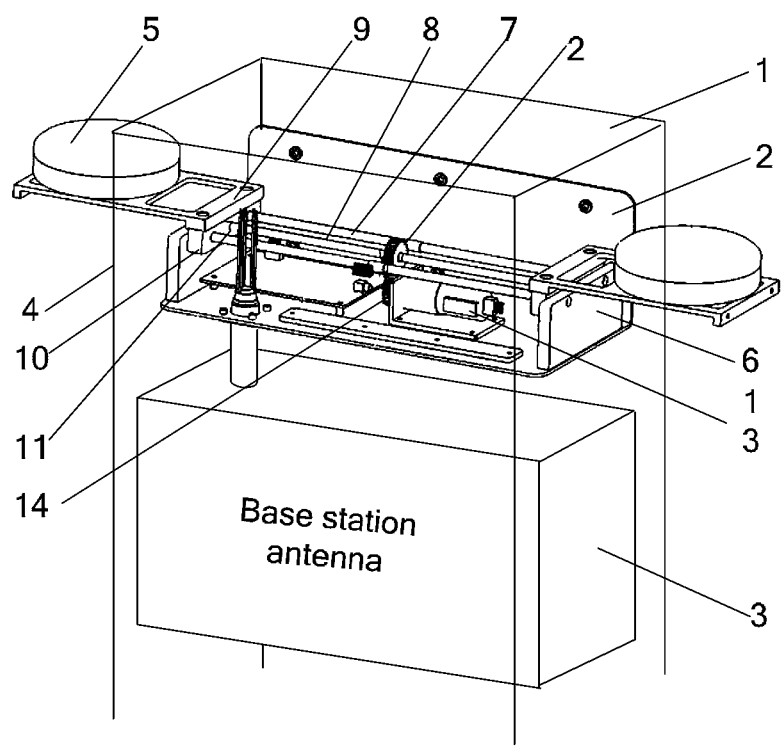
FIG. 4 is a schematic structural diagram of a base station antenna apparatus including two GPS antennas according to an embodiment of the present invention.

An embodiment of the present invention further provides a base station antenna apparatus. As shown in FIG. 3 and FIG. 4, the base station antenna apparatus 1 includes:

a base station antenna 3, an apparatus 2 for collecting an engineering parameter of a base station antenna, and a base station antenna housing 4, where:

the apparatus 2 for collecting an engineering parameter of a base station antenna is configured to collect, save, and manage the engineering parameter of the base station antenna;

the base station antenna 3 and the apparatus 2 for collecting an engineering parameter of a base station antenna are connected and located in the base station antenna housing 4; and the apparatus 2 for collecting an engineering parameter of a base station antenna includes two GPS antennas 5 configured to collect the engineering parameter of the base station antenna, a driving apparatus 21, and a processing apparatus 22 configured to save and manage the engineering parameter of the base station antenna; the processing apparatus 22 is connected to the GPS antennas so as to receive the engineering parameter of the base station antenna collected by the GPS antennas; and the GPS antennas 5 are arranged on the driving apparatus 21.

The driving apparatus 21 is configured to drive the two GPS antennas 5 to move from the inside of the base station antenna housing to the outside of the base station antenna housing, or drive the at least two GPS antennas 5 to move from the outside of the base station antenna housing to the inside of the base station antenna housing. FIG. 3 is a schematic diagram of status of the GPS antennas located inside the base station antenna housing and FIG. 4 is a schematic diagram of status of the GPS antennas located outside the base station antenna housing. The driving apparatus includes a mounting support 6 and two antenna supports 9, where at least two driving levers 7 and at least one screw lever 8 are arranged on the mounting support 6, the driving levers 7 and the screw lever 8 are arranged in parallel, the two GPS antennas 5 are arranged on the two antenna supports 9 separately, a driving block 10 is fixed on the two antenna supports 9 each, a driving nut 11 is arranged on the driving block 10, the at least two driving levers 7 pass through the driving block 10, and the screw lever 8 is screwed into the driving nut 11, so that when the at least one screw lever 8 rotates, the two driving blocks 10 are driven by the driving nut 11 to move away from each other along the at least two driving levers 7, or move toward each other.

The screw lever may be driven by an electromotor 13 arranged on the mounting support 6, or may be driven in another manner. When an electromotor is used for driving, it may be specifically as follows: A driving gear 12 is arranged on the screw lever 8, an electromotor 13 is arranged on the mounting support 6, an electromotor gear 14 is arranged on a rotation end of the electromotor 13, and the electromotor gear 14 is engaged with the driving gear 12, so that the electromotor gear 14 drives the screw lever 8 to rotate.

When the electromotor starts, the electromotor gear 14 drives the driving gear 12 to rotate, and the screw lever 8 also rotates. The driving nut 11 is arranged on the two driving blocks 10 each, and therefore, when the screw lever 8 rotates, the two driving blocks 10 move in a reverse direction or an opposite direction along the driving levers 7, so that the GPS antennas 5 extend to the outside of the base station antenna housing or withdraw from the outside of the base station antenna housing to the inside of the base station antenna housing.

The base station antenna apparatus provided in this embodiment of the present invention integrates a base station antenna with an apparatus for collecting an engineering parameter of a base station antenna, where the apparatus for collecting an engineering parameter of a base station antenna is configured to collect, save, and manage the engineering parameter of the base station antenna. Compared with the prior art in which when acquiring an engineering parameter of a base station antenna, engineering personnel need to carry an external collective device and perform onsite measurement in a base station antenna setting point, in the base station antenna apparatus provided in the present invention, the apparatus for collecting an engineering parameter of a base station antenna is directly disposed on the base station antenna, and the engineering parameter of the base station antenna can be acquired by using remote control, thereby improving collection efficiency, accuracy, and timeliness of the engineering parameter of the base station antenna and implementing real-time monitoring on the engineering parameter of the base station antenna. In addition, an internal electromotor drives a screw lever to rotate in the apparatus for collecting an engineering parameter of a base station antenna, thereby implementing movements of two GPS antennas on the screw lever in an opposite direction and a reverse direction, and implementing that the driving apparatus in the base station antenna apparatus moves the GPS antennas to the outside of a base station antenna housing when the GPS antennas work, or withdraws the GPS antennas to the inside of the base station antenna housing when the GPS antennas stop working. In this way, the GPS antennas are arranged and integrated in the base station antenna housing so that the overall appearance specification of the base station antenna is unchanged, and when the GPS antennas work, the driving apparatus in the base station antenna apparatus is capable of further moving the GPS antennas to the outside of the base station antenna housing, thereby adjusting distances among multiple GPS antennas, so that the GPS antennas acquire a better collection effect.

Figure 5:
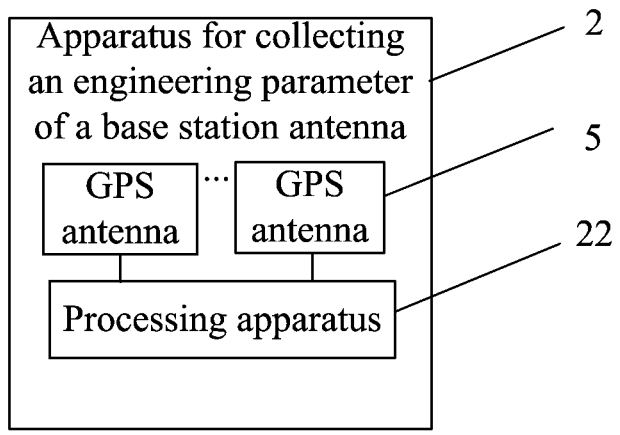
FIG. 5 is a schematic diagram of an apparatus for collecting an engineering parameter of a base station antenna according to an embodiment of the present invention.

An embodiment of the present invention further provides an apparatus for collecting an engineering parameter of a base station antenna, as shown in FIG. 5, the apparatus 2 for collecting an engineering parameter of a base station antenna includes:

at least two GPS antennas 5 and a processing apparatus 22; the at least two GPS antennas 5 are configured to collect an engineering parameter of a base station antenna, and the processing apparatus 22 is configured to save and manage the engineering parameter of the base station antenna; the processing apparatus 22 is connected to the at least two GPS antennas 5 so as to receive the engineering parameter of the base station antenna collected by the at least two GPS antennas 5. The apparatus 2 for collecting an engineering parameter of a base station antenna may be disposed in a base station antenna housing.

The apparatus for collecting an engineering parameter of a base station antenna provided in this embodiment of the present invention acquires an engineering parameter of a base station antenna by using GPS antennas, and saves and manages the engineering parameter of the base station antenna by using a processing apparatus. Compared with the prior art in which when acquiring an engineering parameter of a base station antenna, engineering personnel need to carry an external collective device and perform onsite measurement in a base station antenna setting point, in the base station antenna apparatus provided in the present invention, the apparatus for collecting an engineering parameter of a base station antenna is directly disposed on the base station antenna, and the engineering parameter of the base station antenna can be acquired by using remote control, thereby improving collection efficiency, accuracy, and timeliness of the engineering parameter of the base station antenna and implementing real-time monitoring on the engineering parameter of the base station antenna.

Figure 6:
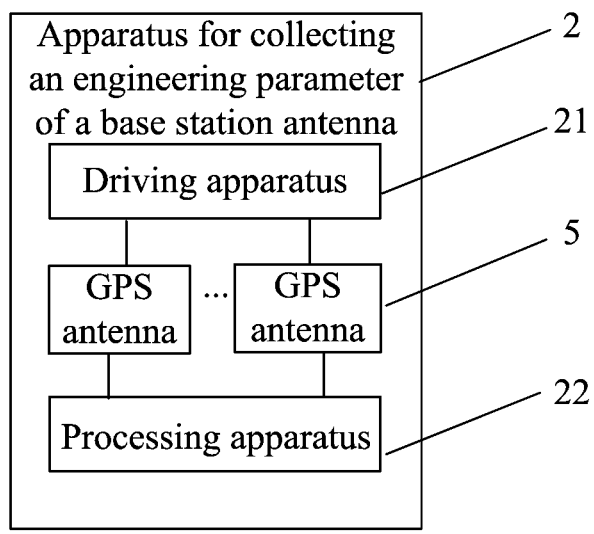
FIG. 6 is a schematic diagram of an apparatus for collecting an engineering parameter of a base station antenna according to an embodiment of the present invention.

Further, the apparatus for collecting an engineering parameter of a base station antenna provided in this embodiment of the present invention, as shown in FIG. 6, further includes: a driving apparatus 21, and the GPS antennas 5 are arranged on the driving apparatus 21; the driving apparatus 21 is configured to drive the at least two GPS antennas 5 to move from the inside of the base station antenna housing to the outside of the base station antenna housing, or drive the at least two GPS antennas 5 to move from the outside of the base station antenna housing to the inside of the base station antenna housing.

Figure 7:
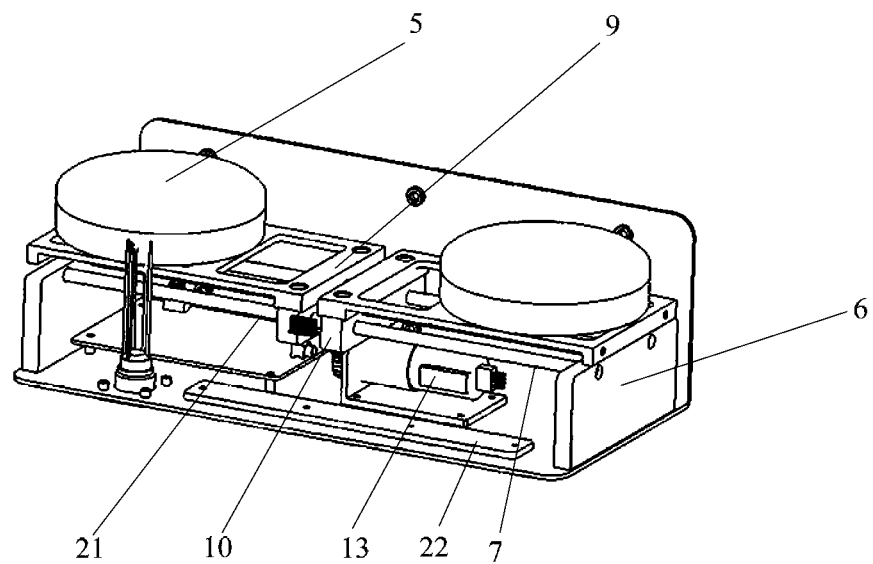
FIG. 7 is a schematic structural diagram of an apparatus for collecting an engineering parameter of a base station antenna including two GPS antennas according to an embodiment of the present invention.
Figure 8:
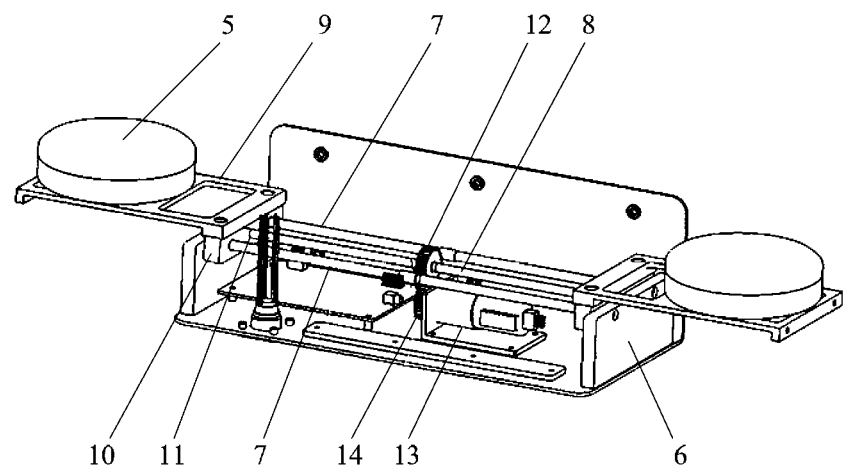
FIG. 8 is a schematic structural diagram of an apparatus for collecting an engineering parameter of a base station antenna including two GPS antennas according to an embodiment of the present invention.

An embodiment of the present invention further provides an apparatus for collecting an engineering parameter of a base station antenna, as shown in FIG. 7 and FIG. 8, including: two GPS antennas 5 configured to collect an engineering parameter of a base station antenna, a driving apparatus 21, and a processing apparatus 22 configured to save and manage the engineering parameter of the base station antenna. The apparatus for collecting an engineering parameter of a base station antenna may be disposed in a base station antenna housing. The processing apparatus 22 is connected to the GPS antennas 5 so as to receive the engineering parameter of the base station antenna collected by the GPS antennas, the GPS antennas 5 are arranged on the driving apparatus 21, and the driving apparatus 21 is configured to drive the two GPS antennas 5 to move from the inside of the base station antenna housing to the outside of the base station antenna housing, or drive the two GPS antennas to move from the outside of the base station antenna housing to the inside of the base station antenna housing. FIG. 7 is a schematic diagram of status of the GPS antennas located inside the base station antenna housing and FIG. 8 is a schematic diagram of status of the GPS antennas located outside the base station antenna housing.

The driving apparatus 21 includes a mounting support 6 and two antenna supports 9, where at least two driving levers 7 and at least one screw lever 8 are arranged on the mounting support 6, the driving levers 7 and the screw lever 8 are arranged in parallel, the two GPS antennas 5 are arranged on the two antenna supports 9 separately, a driving block 10 is fixed on the two antenna supports 9 each, a driving nut 11 is arranged on the driving block 10, the at least two driving levers 7 pass through the driving block 10, and the screw lever 8 is screwed into the driving nut 11, so that when the at least one screw lever 8 rotates, the two driving blocks 10 are driven by the driving nut 11 to move away from each other along the at least two driving levers 7, or move toward each other.

The screw lever may be driven by an electromotor 13 arranged on the mounting support 6, or may be driven in another manner. When an electromotor is used for driving, it may be specifically as follows: A driving gear 12 is arranged on the screw lever 8, an electromotor 13 is arranged on the mounting support 6, an electromotor gear 14 is arranged on a rotation end of the electromotor 13, and the electromotor gear 14 is engaged with the driving gear 12, so that the electromotor gear 14 drives the screw lever 8 to rotate.

When the electromotor starts, the electromotor gear 14 drives the driving gear 12 to rotate, and the screw lever 8 also rotates. The driving nut 11 is arranged on the two driving blocks 10 each, and therefore, when the screw lever 8 rotates, the two driving blocks 10 move in a reverse direction or an opposite direction along the driving levers 7, so that the GPS antennas 5 extend to the outside of the base station antenna housing or withdraw from the outside of the base station antenna housing to the inside of the base station antenna housing.

A base station antenna apparatus provided in the embodiment of the present invention drives a screw lever to rotate by using an internal electromotor in an apparatus for collecting an engineering parameter of a base station antenna, thereby implementing movements of two GPS antennas on the screw lever in an opposite direction and a reverse direction, and implementing that the driving apparatus in the base station antenna apparatus moves the GPS antennas to the outside of a base station antenna housing when the GPS antennas work, or withdraws the GPS antennas to the inside of the base station antenna housing when the GPS antennas stop working. In this way, the GPS antennas are arranged and integrated in the base station antenna housing so that the overall appearance specification of the base station antenna is unchanged, and when the GPS antennas work, the driving apparatus in the base station antenna apparatus is capable of further moving the GPS antennas to the outside of the base station antenna housing, thereby adjusting distances among multiple GPS antennas, so that the GPS antennas acquire a better collection effect.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A base station antenna apparatus, comprising:
   a base station antenna housing;
   a base station antenna, located in the base station antenna housing; and
   a parameter collection apparatus, located in the base station antenna housing and connected to the base station antenna, comprising:
   at least two global positioning system (GPS) antennas, configured to collect an engineering parameter of the base station antenna, and
   a processing apparatus, connected to the at least two GPS antennas, configured to receive the engineering parameter from the at least two GPS antennas and to save and manage the engineering parameter; and
   a driving apparatus configured to drive the at least two GPS antennas in opposite directions so as to move the at least two GPS antennas into and out of the base station antenna housing;
   wherein the driving apparatus further comprises a mounting support and at least two antenna supports;
   wherein at least two driving levers and at least one screw lever are arranged on the mounting support, the driving levers and the screw lever are arranged in the at least two GPS antennas are arranged on the at least two antenna supports separately, a driving block is fixed on each of the at least two antenna supports, a driving nut is arranged on each driving block, the at least two driving levers pass through the driving blocks, and the screw lever is screwed into the driving nuts, so that when the at least one screw lever rotates, the driving blocks are driven by the driving nut to move away from or towards each other along the at least two driving levers.

2. The base station antenna apparatus according to claim 1, wherein the screw lever is driven by an electromotor arranged on the mounting support.

3. The base station antenna apparatus according to claim 2, wherein a driving gear is arranged on the screw lever, an electromotor gear is arranged on a rotation end of the electromotor, and the electromotor gear is engaged with the driving gear, so that the electromotor gear is configured to drive the screw lever to rotate.

4. An apparatus for collecting an engineering parameter of a base station antenna, comprising:
   at least two global positioning system (GPS) antennas, configured to collect the engineering parameter of the base station antenna, and
   a processing apparatus, connected to the at least two GPS antennas, configured to receive the engineering parameter from the at least two GPS antennas and to save and manage the engineering parameter; and
   a driving apparatus, configured to drive the at least two GPS antennas in opposite directions so as to move the at least two GPS antennas into and out of the base station antenna housing, wherein the driving apparatus further comprises: a mounting support and at least two antenna supports;
   wherein at least two driving levers and at least one screw lever are arranged on the mounting support, the driving levers and the screw lever are arranged in parallel, the at least two GPS antennas are arranged on the at least two antenna supports separately, a driving block is fixed on each of the at least two antenna supports, a driving nut is arranged on each driving block, the at least two driving levers pass through the driving blocks, and the screw lever is screwed into the driving nuts, so that when the at least one screw lever rotates, the driving blocks are driven by the driving nut to move away from or towards each other along the at least two driving levers;
   wherein the apparatus for collecting the engineering parameter of the base station antenna is disposed in a base station antenna housing.

5. The apparatus according to claim 4, wherein the screw lever is driven by an electromotor arranged on the mounting support.

6. The apparatus according to claim 5, wherein a driving gear is arranged on the screw lever, an electromotor gear is arranged on a rotation end of the electromotor, and the electromotor gear is engaged with the driving gear, so that the electromotor gear is configured to drive the screw lever to rotate.

7. An apparatus, comprising:
   a base station antenna, located in a base station antenna housing;
   at least two global positioning system (GPS) antennas, configured to collect an engineering parameter of the base station antenna, and
   a mounting support and at least two antenna supports,
   wherein at least two driving levers and at least one screw lever are arranged on the mounting support, the driving levers and the screw lever are arranged in parallel, the at least two GPS antennas are arranged on the at least two antenna supports separately, a driving block is fixed on each of the at least two antenna supports, a driving nut is arranged on each driving block, the at least two driving levers pass through the driving blocks, and the screw lever is screwed into the driving nuts, so that when the at least one screw lever rotates, the driving blocks are driven by the driving nut to move away from or towards each other along the at least two driving levers, to cause the at least two GPS antennas to move from the inside/outside to the outside/inside of the base station antenna housing.

8. The apparatus according to claim 7, wherein the screw lever is driven by an electromotor arranged on the mounting support.

9. The apparatus according to claim 8, wherein a driving gear is arranged on the screw lever, an electromotor gear is arranged on a rotation end of the electromotor, and the electromotor gear is engaged with the driving gear, so that the electromotor gear is configured to drive the screw lever to rotate.

\* \* \* \* \*